(12) United States Patent
Hayashi

(10) Patent No.: US 8,039,044 B2
(45) Date of Patent: Oct. 18, 2011

(54) METHOD FOR FORMING ELECTRODE FOR BATTERY

(75) Inventor: Tetsuya Hayashi, Osaka (JP)

(73) Assignee: Panasonic Corporation, Osaka (JP)

(*) Notice: Subject to any disclaimer, the term of this patent is extended or adjusted under 35 U.S.C. 154(b) by 980 days.

(21) Appl. No.: 11/706,332

(22) Filed: Feb. 15, 2007

(65) Prior Publication Data

US 2007/0231464 A1 Oct. 4, 2007

(30) Foreign Application Priority Data

Mar. 30, 2006 (JP) ................. 2006-094007

(51) Int. Cl.
*B05D 5/12* (2006.01)
*B05D 3/12* (2006.01)
(52) U.S. Cl. ............ 427/123; 427/359; 427/372.2; 427/428.08; 427/428.2
(58) Field of Classification Search .......... 427/58, 427/256, 355, 359, 372.2, 115, 123, 428.08, 427/428.2
See application file for complete search history.

(56) References Cited

U.S. PATENT DOCUMENTS 7,495,349 B2 * 2/2009 Mitchell et al. ............ 361/504
2004/0096585 A1 * 5/2004 Bonnebat et al. ........... 427/318

FOREIGN PATENT DOCUMENTS

| JP | 11-005052 | * | 1/1999 |
| JP | 2005-183181 A | | 7/2005 |
| JP | 2005-216722 A | | 8/2005 |
| JP | 2005-216723 A | | 8/2005 |

* cited by examiner

*Primary Examiner* — Brian K Talbot
(74) *Attorney, Agent, or Firm* — McDemott Will & Emery LLP

(57) ABSTRACT

A plurality of gravure rolls are rotated while being allowed to abut against a surface of a moving electrode hoop, thereby applying a coating fluid serving as a precursor of porous layers onto a plurality of linear mixture layers. In this way, a plurality of linear porous layers are formed on the associated linear mixture layers formed on the surface of the electrode hoop. In this case, the location at which each gravure roll abuts against the surface of the electrode hoop is controlled according to variations in the lateral location of associated one of the mixture layers independently of the other gravure rolls.

4 Claims, 2 Drawing Sheets

METHOD FOR FORMING ELECTRODE FOR BATTERY

CROSS-REFERENCE TO RELATED APPLICATIONS

The disclosure of Japanese Patent Application No. 2006-094007 filed on Mar. 30, 2006 including specification, drawings and claims is incorporated herein by reference in its entirety.

BACKGROUND OF THE INVENTION (1) Field of the Invention

The present invention relates to methods for forming porous layers on the outer surfaces of electrode hoops of nonaqueous electrolyte secondary batteries or other batteries.

(2) Description of Related Art

As portable electronic devices and cordless electronic devices have come to be more widely used, expectations are growing for lightweight nonaqueous electrolyte secondary batteries with high energy density. However, an active material of such a nonaqueous electrolyte secondary battery is made of highly reactive lithium, and therefore a short circuit between a positive electrode and a negative electrode under abnormal conditions generates heat. Due to the generated heat, a resinoid microporous membrane separator for isolating the positive electrode from the negative electrode melts around the area in which the electrodes are short-circuited, thereby increasing the area in which the electrodes are short-circuited and thus generating abnormal superheat. In order to prevent this, a technique is being used in which, in case of the occurrence of a short circuit between electrodes, superheat due to an increase in the area where the electrodes are short-circuited is suppressed by combining a porous refractory layer having a refractory resin or an inorganic oxide as the main ingredient with the resinoid microporous membrane separator.

Such a porous refractory layer is formed on the outer surface of a positive electrode or a negative electrode (hereinafter, referred to as an "electrode") without loss of the design capacity of a battery to have a thickness of 2 through 10 µm. A method in which a coating fluid serving as a precursor of a porous refractory layer is transferred to a gravure roll provided with a plurality of grooves and the transferred coating fluid is applied to the outer surface of a target electrode hoop (hereinafter, referred to as "gravure method") is preferably employed as a method for forming a layer of a thickness as described above with high accuracy. In order to realize the gravure method, the direction in which an electrode hoop travels is allowed to become opposite to the direction of rotation of a gravure roll. In this way, a thin coating membrane can be formed on the outer surface of an object to be coated with a coating fluid with high accuracy.

By the way, from the viewpoint of improving the productivity of electrodes, electrodes each serving as a base of a porous refractory layer are typically processed in the following manner: A core that is several times as wide as each electrode itself is prepared; a plurality of linear mixture layers containing an active material are formed on the core; and then the core is cut into pieces each having one of the linear portions of the mixture layer. In view of the above, a plurality of porous refractory layers need be formed in consideration of the shape of each electrode.

A method in which a masking tape is bonded to the outer surface of a core, then a mixture layer is formed on the masking tape, and thereafter the masking tape is removed has been disclosed, as a method for forming a mixture layer on the outer surface of a core with high accuracy, in Japanese Unexamined Patent Publications Nos. 2005-183181, 2005-216722 and 2005-216723. Application of this method allows a plurality of linear porous refractory layers each having a predetermined width to be formed on the outer surface of an electrode.

By the way, in a case where an electrode hoop in which a plurality of linear mixture layers containing an active material are placed on a core is to be formed on the precondition that the core is partially exposed at both lateral end parts of the electrode hoop, any one of the following methods will be employed.

(1) A mixture paste (a precursor of mixture layers) is applied to a core, and then part of this mixture paste is scraped off the core before drying of the mixture paste such that a plurality of linear mixture layers are left on the core.

(2) A mixture paste is applied to a core, and then a mixture layer formed by drying the mixture paste is partially scraped off the core such that a plurality of linear mixture layers are left on the core.

(3) A plurality of linear mixture pastes are applied onto a core at fixed intervals, thereby forming a plurality of linear mixture layers.

For the electrode hoop formed by each of the above-mentioned methods, the location and width of each of a plurality of linear mixture layers (hereinafter, referred to "the lateral location of each mixture layer") frequently vary due to the following reasons. More particularly, when the electrode hoop is formed by each of the methods (1) and (2), the locations of both lateral ends of the initially applied mixture paste vary. The reason for this is that the amount of the mixture paste spread toward two of exposed parts of the core corresponding to both lateral end parts thereof varies according to variations in the properties of the mixture paste with time. When the mixture paste or the mixture layer obtained by drying the mixture paste is divided into a plurality of portions in a later process, the both lateral ends of the initially formed mixture paste will become part of the outermost ones of the plurality of linear mixture layers. The width of each of the outermost ones of the plurality of linear mixture layers varies independently of the other ones of the plurality of linear mixture layers. Furthermore, when the electrode hoop is formed by the method (3), variations in the properties of the mixture paste with time make it difficult to keep the properties of the applied linear mixture pastes fixed. Therefore, the width of each of the linear mixture layers varies independently of the other linear mixture layers.

Since the lateral location of each mixture layer varies independently of the other mixture layers, the location at which a porous refractory layer to be formed on the mixture layer is formed must also be changed according to variations in the lateral location of the mixture layer.

However, in a case where a plurality of linear porous refractory layers are formed using the above-described masking tape to each have a predetermined width, this causes the following problems. More particularly, the location of a part of a core to which the masking tape is bonded needs to be frequently changed according to variations in the lateral location of each of mixture layers. When the location of the part of the core to which the masking tape is bonded is changed, the softness of the masking tape may cause the masking tape to become crinkled. In this case, an effect arising from the masking tape (hereinafter, referred to as "masking effect") cannot be sufficiently provided.

On condition that when an electrode hoop is cut into pieces, a porous refractory layer is present, due to an insufficient masking effect, at a location at which a core is cut and at which the porous refractory layer should be essentially absent, burrs of the porous refractory layer may be produced at a location at which the core is cut. When such burrs are mixed into final products, i.e., batteries, this causes short circuits inside the batteries, leading to a decrease in the reliability of the products.

SUMMARY OF THE INVENTION

The present invention is made based on the above-mentioned problem, and its object is to provide a battery with high reliability by stably forming a plurality of linear porous layers on an electrode hoop formed at its surface with a plurality of linear mixture layers.

A method for forming an electrode for a battery according to the present invention includes the step of when a plurality of linear porous layers are formed on a plurality of mixture layers formed on the surface of the electrode hoop, rotating a plurality of gravure rolls oppositely to the direction of movement of the electrode hoop while allowing the gravure rolls to abut against the surface of the moving electrode hoop, thereby applying a coating fluid serving as a precursor of the porous layers onto the mixture layers. In this step, the location at which each said gravure roll abuts against the surface of the electrode hoop is controlled according to variations in the lateral location of associated one of the mixture layers independently of the other gravure rolls.

In this manner, the location at which each gravure roll abuts against the outer surface of the electrode hoop is independently controlled according to variations in the lateral location of associated one of the mixture layers. This allows the linear porous layers to be formed precisely on the associated mixture layers and can effectively prevent burrs from being produced at a location at which the electrode hoop is cut in the later process step of dividing the electrode hoop. As a result, safe batteries can be achieved.

DETAILED DESCRIPTION OF THE INVENTION

Figure 1:
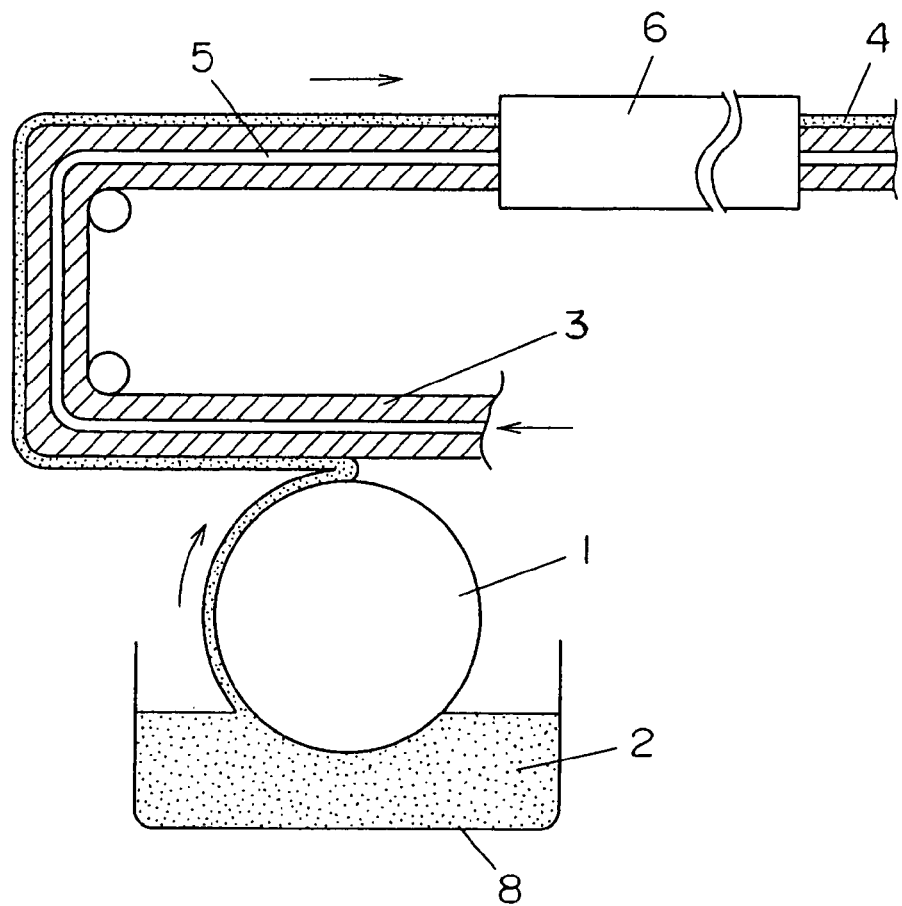
FIG. 1 is a schematic side view illustrating a method for forming a porous layer according to an embodiment of the present invention.

Embodiments of the present invention will be described hereinafter with reference to the drawings. In the following drawings, components having substantially the same function are denoted by the same reference numerals for simplicity of description. The present invention is not limited to the following embodiments.

Figure 2:
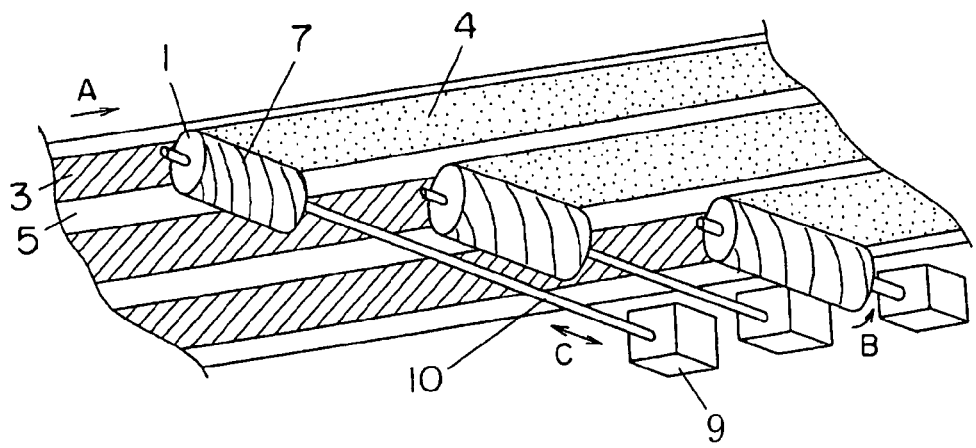
FIG. 2 is a schematic bottom view partially illustrating the method for forming a porous layer according to the embodiment of the present invention.

FIGS. 1 and 2 are diagrams for explaining a method for forming an electrode for a battery according to an embodiment of the present invention and schematic views illustrating the process of forming a porous layer on the outer surface of an electrode hoop. FIG. 1 is a schematic view of the electrode hoop when viewed from side, and FIG. 2 is a schematic view of the electrode hoop when viewed upward from a coating fluid tank 8.

The method for forming an electrode for a battery according to this embodiment includes the process steps of preparing an electrode hoop in which a plurality of linear mixture layers 3 containing an active material are formed on the surfaces of a core 5, forming a plurality of linear porous layers 4 on associated outer ones of the mixture layers 3 formed on the surfaces of the electrode hoop, and dividing the electrode hoop between adjacent ones of the linear porous layers 4. The process step of forming the porous layer 4 includes the substeps of rotating a plurality of gravure rolls 1 oppositely to the direction of movement of the electrode hoop while allowing the gravure rolls 1 to abut against the outer surface of the moving electrode hoop (the outer ones of the mixture layers 3), thereby applying a coating fluid 2 serving as a precursor of the porous layers 4 onto the outer ones of the mixture layers 3. The location at which each gravure roll 1 abuts against the outer surface of the electrode hoop (the outer ones of the mixture layers 3) is controlled according to variations in the lateral location of associated one of the mixture layers 3 independently of the other gravure rolls 1.

More particularly, as illustrated in FIGS. 1 and 2, the electrode hoop in which the linear mixture layers 3 containing an active material are formed on a core 5 is continuously supplied outward from an uncoiler (not shown) also serving as a driver and allowed to travel in a specific direction (the direction illustrated by the arrow A in FIG. 2). Furthermore, a plurality of gravure rolls 1 formed with grooves 7 are placed inside at least one coating fluid tank 8 in which a coating fluid 2 serving as a precursor of porous layers 4 is stored. The plurality of gravure rolls 1 are allowed to abut against the outer surface of the electrode hoop (the outer ones of the mixture layers 3) and rotated oppositely to the direction of movement of the electrode hoop (in the direction illustrated by the arrow B in FIG. 2). In this way, the coating fluid 2 stored in the coating fluid tank 8 is applied to the outer surfaces of the outer ones of the mixture layers 3 along the grooves 7 of the gravure rolls 1.

As described above, the phase of each mixture layer 3 formed on the core 5 (the lateral location of the mixture layer 3) is frequently shifted along the width of the electrode hoop. This phase shift is sensed by a sensor (not shown) placed at an arbitrary location between the uncoiler and the gravure rolls 1 and then transferred to a controller 9. For example, as illustrated in FIG. 2, a controller 9 with which each gravure roll 1 is formed allows a rotating shaft 10 for the gravure roll 1 to slide in and out along the width of each of outer ones of mixture layers 3 (as illustrated by the arrow C in FIG. 2) in response to the transferred phase shift. In this way, the gravure roll 1 is arranged at an appropriate location. This action is independently carried out for each gravure roll 1. Thereafter, the electrode hoop passes through a dryer 6, thereby forming a plurality of linear porous layers 4.

In view of the above, the location at which each gravure roll 1 abuts against the outer surface of the electrode hoop is independently controlled according to variations in the lateral location of associated one of the mixture layers 3. This allows the linear porous layers 4 to be formed precisely on the associated mixture layers 3 and can effectively prevent burrs from being produced at a location at which the core 5 is cut in the later process step of dividing the electrode hoop. As a result, safe batteries can be achieved.

In a case where a porous layer 4 is formed to cover the entire surface of each of the outer ones of the mixture layers 3, a method in which the lateral middle of associated one of the gravure rolls 1 is controlled by a controller 9 to always coincide with the lateral middle of the mixture layer 3 is used as the way of operating the controller 9. For example, when the width of the mixture layer 3 is set at A and the width of the applied coating fluid 2 is set at (A+B), unless the width of the mixture layer 3 reaches (A+B), the porous layer 4 can be formed by the above-mentioned method to always cover the entire surface of the mixture layer 3.

In FIGS. 1 and 2, the case where a porous layer 4 is formed to cover the entire surface of each of the outer ones of the mixture layers 3 is illustrated. However, in a case where porous layers 4 are to be formed to cover only both lateral end parts of each of outer ones of mixture layers 3, the number of gravure rolls 1 need be twice the number of linear mixture layers 3. In this case, the gravure rolls 1 are separately controlled in terms of their locations.

A coating fluid tank 8 in which the coating fluid 2 is stored may be provided for each of gravure rolls 1. It is considered that if the area of the opening of a coating fluid tank 8 is increased such that all the gravure rolls 1 are placed inside this coating fluid tank 8, the coating fluid 2 can be centrally controlled. Meanwhile, in a case where the thickness of a target to which the coating fluid 2 is to be applied is small, settling of the coating fluid 2 becomes apparent. The reason for this is that in this case, the coating fluid 2 must be a Newtonian fluid. The present inventors have found that rotation of the gravure rolls 1 allows the coating fluid 2 to be reasonably agitated and thus prevents the settling. More particularly, when a coating fluid tank 8 in which the coating fluid 2 is stored is provided for each of gravure rolls 1 so that the agitation effect provided by the rotation of the gravure roll 1 entirely affects the coating fluid 2 in the coating fluid tank 8, settling of the coating fluid 2 can be more effectively restrained than when the coating fluid 2 is centrally controlled while dead space that is not affected by the agitation effect is left in the coating fluid tank 8. In view of the above, even with long-time application of the coating fluid 2 to the target, the thickness of each of porous layers 4 can become uniform.

In particular, in a case where the coating fluid 2 is allowed to contain an inorganic oxide filler, a significant effect is produced by individually providing coating fluid tanks 8 for associated gravure rolls 8. The reason for this is as follows. Since the melting temperature of an inorganic oxide filler exceeds 1000° C., the inorganic oxide filler is a potential material of a refractory porous layer 4. In spite of this, since the density of the inorganic oxide filler in the coating fluid 2 exceeds 3 g/ml, the sinkability thereof is significant.

An apparatus for forming an electrode for a battery using the method for forming an electrode for a battery according to this embodiment can be configured as illustrated in FIG. 1. More particularly, the apparatus includes a driver (not shown) for allowing an electrode hoop to travel in a specific direction, at least one coating fluid tank 8 for storing a coating fluid 2 serving as a precursor of a porous layer 4, a plurality of gravure rolls 1 placed to abut against the outer surface of the electrode hoop (outer ones of mixture layers 3), and a plurality of controllers 9 for controlling the locations of the gravure rolls 1 and may further include a dryer 6 for drying the coating fluid 2 applied onto outer ones of mixture layers 3.

With the above-mentioned structure, the coating fluid 2 stored in the coating fluid tank 8 is applied onto the outer ones of the mixture layers 3 along a plurality of grooves formed in the circumferential surfaces of the rotating gravure rolls 1. The locations at which the gravure rolls 1 abut against the outer surface of the electrode hoop are individually controlled according to variations in the lateral locations of the outer ones of the mixture layers 3 by the controllers 9. This allows porous layers 4 to be formed precisely on the associated outer ones of the mixture layers 3 and can effectively prevent burrs from being produced at a location at which the core 5 is cut in the later process step of dividing the electrode hoop. As a result, safe batteries can be achieved.

With the above-mentioned structure, it is preferable that the apparatus further includes a sensor (not shown) for sensing the lateral locations of the mixture layers 3. Thus, the location at which each gravure roll 1 abuts against the outer surface of the electrode hoop can be more accurately adjusted by associated one of the controllers 9 according to variations in the lateral location of associated one of the mixture layers 3 sensed by the sensor.

Furthermore, the apparatus may further include a divider (such as a slitting knife) for dividing the electrode hoop. After a plurality of linear porous layers 4 are formed on the outer surface of the electrode hoop, the electrode hoop is divided between adjacent ones of the linear porous layers 4. In this way, electrodes for batteries can be efficiently fabricated.

Moreover, a plurality of coating fluid tanks 8 are preferably in one-to-one correspondence with a plurality of gravure rolls 1. As described above, since the agitation effect provided by the rotation of each gravure roll 1 entirely affects the coating fluid 2 in associated one of the coating fluid tanks 8, settling of the coating fluid 2 can be effectively restrained. In view of the above, even with long-time application of the coating fluid 2 to the target, the thickness of the porous layer 4 can become uniform.

A refractory material having a much higher melting point or thermal decomposition temperature than 200° C. is preferably used as a material of the porous layers 4 of the present invention. More specifically, a refractory resin, such as polytetrafluoroethylene (PTFE), polyimide and polyamide, an inorganic oxide filler, such as alumina and magnesia, or any other material can be used. In order to ensure the adhesion between each porous layer 4 and an electrode to be coated with the porous layer 4, a binder, e.g., polyvinylidene fluoride (PVDF), acrylic rubber particles (for example, BM-500B manufactured by Zeon corporation, Japan) or any other material, is preferably added to the porous layer 4. The binder has the advantages of not only possessing appropriate heat resistance but also holding gaps in the porous layer 4 and thus maintaining the ion conductivity of the porous layer 4 due to reduced electrolyte-swellability. When the coating fluid 2 serving as a precursor of the porous layer 4 is prepared, the above-described material is preferably dispersed or dissolved into a polar organic solvent, such as N-methyl-2-pyrrolidene (NMP).

In a case where an electrode hoop to be coated with the coating fluid 2 is a precursor of a negative electrode of a nonaqueous electrolyte secondary battery, not only a carbonaceous material, such as graphite, but also a high-capacity material containing at least one of elements that can be alloyed with lithium having a theoretical capacitance density of 400 mAh/g or more can be used as an active material. The elements that can be alloyed with lithium include Al, Zn, Ge, Cd, Sn Pb, and any other element. In particular, Si and Sn are preferably used as the elements that can be alloyed with lithium, because use of Si and Sn provides a material in which a large amount of lithium can be stored and Si and Sn are easily available. Various materials, such as a single element, e.g., Si alone or Sn alone, an oxide, e.g., $SiO_x$ ($0<x<2$) or $SnO_x$ ($0<x\leqq2$), an alloy containing a transition metal element, e.g., a Ni—Si alloy, a Ti—Si alloy, a Mg—Sn alloy, Fe—Sn alloy, or any other alloy, can be used as the material containing Si or Sn.

In a case where a method in which a particle-like active material is applied onto a core 5 is employed, PVDF, a styrene-butadiene copolymer (SBR), or a modification of acrylic acid based polymer can be used as a binder. In a case where a water-based paste is applied, as the binder, to the core 5, use of carboxy methyl cellulose (CMC), polyacrylic acid or any other material as a water soluble thickener increases the stability of the paste. Many of the above-mentioned high-capacity materials exhibit poor electrical conductivity. Therefore, graphite, such as artificial graphite, carbon blacks, such as acetylene black or Ketjen black, carbon fibers, or any other material is preferably added, as a conductive agent, to the high-capacity material. Mixture layers 3 are formed by forming the above-mentioned materials on the core 5. A metal foil made of copper, copper alloy, or any other metal or a porous body (such as lath metal or foam metal) can be used for the core 5.

In a case where an electrode hoop to be coated with the coating fluid 2 is a precursor of a positive electrode of a nonaqueous electrolyte secondary battery, $LiCoO_2$, $LiNi_xCo_yO_2$ (x+y=1), or $LiNi_xMn_yCo_zO_2$ (x+y+z=1) can be used as an active material. Since a method in which a particle-like active material is applied onto a core 5 is employed, PVDF, PTFE, or any other material can be used as a binder. In a case where water-based paste is applied, as the binder, to the core 5, CMC, polyacrylic acid or any other material can be used for a water soluble thickener. The above-mentioned high-capacity materials exhibit poor electrical conductivity. Therefore, graphite, such as artificial graphite, carbon blacks, such as acetylene black or Ketjen black, carbon fibers, or any other material is preferably added, as a conductive agent, to the high-capacity material. Mixture layers 3 are formed by forming the above-mentioned materials on the core 5. A metal foil made of aluminum, aluminum alloy, nickel, or any other metal or a porous body (such as lath metal or foam metal) can be used for the core 5.

In Examples, the present invention will be described hereinafter in more detail.

EXAMPLE 1

As illustrated in FIG. 1, a negative electrode hoop in which mixture layers 3 are formed on both surfaces of a core 5 made of 10-μm-thick copper foil to each have a graphite-to-SBR-to-CMC weight ratio of 100:1:1 was wound in a coil form and then attached to an uncoiler also serving as a driver. The negative electrode hoop has a thickness of 150 μm, an active material density of 1.6 g/ml, and an overall width of 200 mm. The width of each of the mixture layers 3 is 180 mm, the width of each of exposed parts of the core 5 located to the outermost sides of the outermost ones of the mixture layers 3 is 10 mm, and a piece of the negative electrode hoop has a length of 100 m. Meanwhile, a coating fluid 2 in which the weight ratio of alumina (AES-12 manufactured by Sumitomo Chemical Co., Ltd.) to PVDF serving as a binder (#1320 manufactured by Kureha Corporation) to NMP serving as a solvent is 100:42:113 was stored in a coating fluid tank 8 (having an opening area of 0.5 $m^2$). A plurality of gravure rolls 1 formed at their circumferential surfaces with grooves 7 were placed so as to be partially immersed in the coating fluid 2. The width of the circumferential surface of each gravure roll 1 is 180.5 mm, the diameter of the gravure roll 1 is 120 mm, the width of each of grooves 7 is 0.2 mm, the depth thereof is 0.1 mm, the distance between adjacent ones of the grooves 7 is 0.25 mm, and the angle of inclination of each groove 7 is 45°.

While the negative electrode hoop was moved from the uncoiler at a rate of 3 m/min, a microscope (sensor) placed between the uncoiler and the gravure rolls 1 sensed the lateral middles of three lower ones of mixture layers 3. Controllers 9 controlled rotating shafts 10 based on the sensed results so that the lateral middles of the gravure rolls 1 are allowed to coincide with the lateral middles of the associated lower mixture layers 3 by allowing the rotating shafts 10 to slide in and out. Meanwhile, the lower ones of the mixture layers 3 of the negative electrode hoop were allowed to abut against the top ends of the associated gravure rolls 1. Thereafter, the negative electrode hoop is introduced into a drying furnace 6 (having a length of 2 m) and then dried at a temperature of 120° C. In this way, three linear porous refractory layers 4 were formed on the outer surfaces of the associated lower ones of the mixture layers 3 to have an average thickness of 4 μm and again wound in a coil form by a coiler (not shown). The rotational speed of each gravure roll 1 was set at 4 m/min, and the direction of rotation of the gravure roll 1 was set to be opposite to the direction in which the negative electrode hoop travels.

As a result of evaluating one of the porous layers 4 obtained by applying the coating fluid 2 to the middle one of the three lower linear mixture layers 3, no exposed part of the mixture layer 3 was found. Meanwhile, although the thickness of the porous layer 4 measured by a microgauge immediately after the beginning of application of the coating fluid 2 to the associated mixture layer 3 was 4 μm, the thickness thereof measured immediately before the completion of the application thereof was reduced to 2 μm. The reason for this is considered that the agitation effect provided by the rotation of associated one of the gravure rolls 1 did not entirely affect the coating fluid 2 in the coating fluid tank 8 and thus settling of the coating fluid 2 became apparent to some extent.

EXAMPLE 2

In Example 2, unlike Example 1, coating fluid tanks 8 (which each have an opening area of 0.03 $m^2$ and) in which a coating fluid 2 is stored are individually provided for gravure rolls 1. With this exception, porous layers 4 were formed by exercising the same control as in Example 1 using the same negative electrode hoop thereas.

As a result of evaluating one of the porous layers 4 obtained by applying the coating fluid 2 to the middle one of three lower ones of linear mixture layers 3, no exposed part of the mixture layer 3 was found. Furthermore, when the thickness of the entire region of the porous layer 4 obtained by applying the coating fluid 2 to the associated mixture layer 3 was measured by a microgauge, the entire region of the porous layer 4 had a predetermined thickness (4 μm). The reason for this is considered that the agitation effect provided by the rotation of associated one of the gravure rolls 1 entirely affected the coating fluid 2 in associated one of the coating fluid tanks 8 and thus settling of the coating fluid 2 was able to be restrained.

COMPARATIVE EXAMPLE 1

Figure 3:
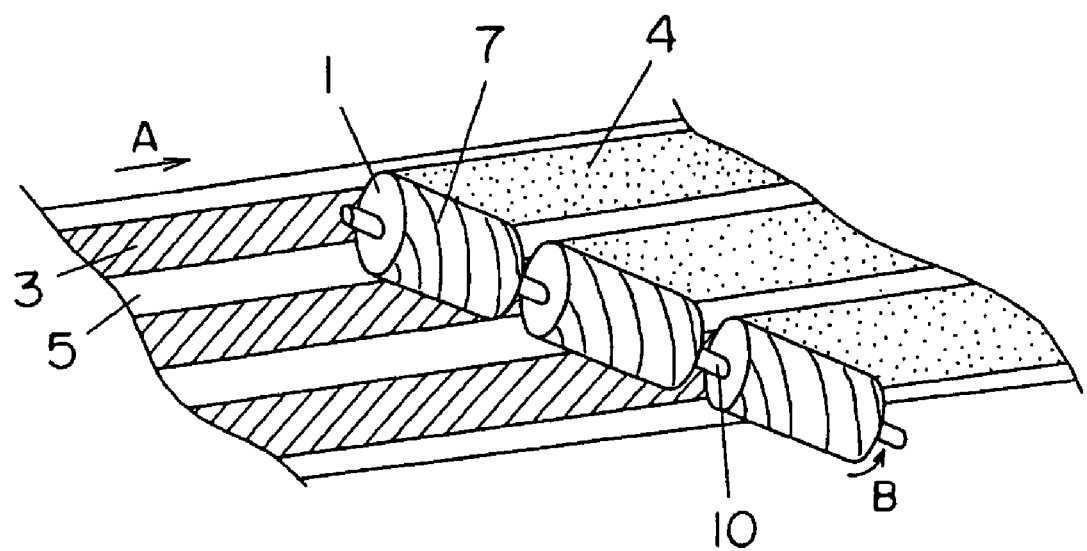
FIG. 3 is a schematic bottom view illustrating a method for forming a porous layer using a plurality of gravure rolls.

In Comparative Example 1, unlike Example 1, control in which gravure rolls 1 were allowed to individually move according to variations in the lateral locations of associated ones of mixture layers 3 is not exercised as illustrated in FIG. 3. With this exception, porous layers 4 were formed using the same negative electrode hoop as in Example 1.

As a result of evaluating one of the porous layers 4 obtained by applying a coating fluid 2 to the middle one of three lower ones of the linear mixture layers 3, exposed part of the mixture layer 3 was found. The reason for this is considered that associated one of the gravure rolls 1 was not allowed to move to an appropriate location according to variations in the lateral location of the mixture layer 3.

Although the present invention was described above with reference to the preferred embodiments, the above description is not limited and can be certainly modified in various ways. The type of secondary batteries to which the present invention is applied is not particularly limited, and the present invention can be applied to not only lithium ion secondary batteries but also nickel hydrogen storage batteries and other batteries. Furthermore, also when the present invention is applied to electrochemical elements (e.g., condensers) having the same current-collecting structure as that of the present invention, the same effect can be provided.

What is claimed is:

1. A method for forming an electrode for a battery, said method comprising the steps of:
    preparing an electrode hoop formed at its surface with a plurality of linear mixture layers containing an active material;
    forming a plurality of linear porous layers on the mixture layers formed on the surface of the electrode hoop, where the porous layers are each wider than the corresponding mixture layer;
    dividing the electrode hoop between adjacent ones of the porous layers,
    the step of forming the porous layers comprising the substep of
    rotating a plurality of gravure rolls oppositely to the direction of movement of the electrode hoop while allowing the gravure rolls to abut against the surface of the moving electrode hoop, thereby applying a coating fluid serving as a precursor of the porous layers onto the mixture layers,
    wherein the location at which each said gravure roll abuts against the surface of the electrode hoop is controlled according to variations in the lateral location of associated one of the mixture layers independently of the other gravure rolls such that lateral middles of the mixture layers coincide with lateral middles of the corresponding gravure rolls,
    the coating fluid is contained in a plurality of coating fluid tanks each of which is provided for a corresponding one of the gravure rolls, and
    while the gravure rolls rotate, the coating fluid serving as the precursor of the porous layers is supplied from each of the coating fluid tanks provided for each of the gravure rolls to the corresponding gravure roll, and the coating fluid is applied onto the mixture layers.

2. The method of claim 1, wherein the step of forming the plurality of linear porous layers further includes the substep of drying the coating fluid applied onto the mixture layers.

3. The method of claim 1, wherein each said porous layer is formed to cover an entire surface of associated one of the mixture layers.

4. The method of claim 1, wherein an inorganic oxide filler is contained in the coating fluid.

* * * * *